US012736411B2

(12) United States Patent
Russell et al.

(10) Patent No.: US 12,736,411 B2
(45) Date of Patent: Sep. 15, 2026

(54) MOLDED SENSOR ASSEMBLY

(71) Applicant: Merit Medical Systems, Inc., South Jordan, UT (US)

(72) Inventors: Rick Russell, Cottonwood Heights, UT (US); Jonathan Cheney, West Jordan, UT (US); Scott Brown, Riverton, UT (US); Luca Salmaso, Ango (CH); Aaron Hopkinson, Herriman, UT (US)

(73) Assignee: Merit Medical Systems, Inc., South Jordan, UT (US)

( * ) Notice: Subject to any disclaimer, the term of this patent is extended or adjusted under 35 U.S.C. 154(b) by 741 days.

(21) Appl. No.: 17/934,132

(22) Filed: Sep. 21, 2022

(65) Prior Publication Data

US 2023/0096042 A1 Mar. 30, 2023

Related U.S. Application Data

(60) Provisional application No. 63/247,616, filed on Sep. 23, 2021.

(51) Int. Cl.
*G01K 1/08* (2021.01)
*G01D 11/24* (2006.01)

(52) U.S. Cl.
CPC ............. *G01K 1/08* (2013.01); *G01D 11/245* (2013.01)

(58) Field of Classification Search
CPC ............................... G01K 1/08; G01D 11/245
USPC .......................................... 374/208; 73/866.5
See application file for complete search history.

(56) References Cited

U.S. PATENT DOCUMENTS 5,419,148 A * 5/1995 Kuehl .................. F25D 29/005 62/130
5,871,627 A 2/1999 Abraham-Fuchs et al.
7,021,148 B2 4/2006 Kuhn et al.
2004/0050168 A1 3/2004 Uberreiter
2008/0314171 A1* 12/2008 Vincent ................ G01D 11/245 73/866.5
2009/0057789 A1 3/2009 Huang et al.
2010/0030137 A1 2/2010 Hall et al.
2011/0009800 A1 1/2011 Dam et al.
2012/0042734 A1 2/2012 Wade et al.
2012/0095351 A1 4/2012 Klose et al.
2015/0247774 A1 9/2015 Wagner et al.
(Continued)

FOREIGN PATENT DOCUMENTS

CN 106370218 A 2/2017
JP 06028660 2/2006
(Continued)

OTHER PUBLICATIONS

Office Action dated Sep. 28, 2023 for U.S. Appl. No. 17/209,663.
(Continued)

*Primary Examiner* — Mirellys Jagan
(74) *Attorney, Agent, or Firm* — Dorsey & Whitney LLP

(57) ABSTRACT

A molded sensor assembly for measuring parameters in a given circumstance. The molded sensor assembly includes a housing with one or more apertures that extends from an upper surface to a lower surface of the housing. A lower surface of the housing is coupled to an upper surface of a printed circuit board member. A sensor is disposed within the housing, the sensor comprising wires that are coupled to the printed circuit board member. Each wire extends through an aperture of the housing.

19 Claims, 9 Drawing Sheets

(56) References Cited

U.S. PATENT DOCUMENTS

| | | | | |
|---|---|---|---|---|
| 2015/0292954 | A1 | 10/2015 | Takeda | |
| 2017/0115169 | A1 | 4/2017 | Busche | |
| 2017/0326282 | A1 | 11/2017 | Wilt et al. | |
| 2018/0110913 | A1 | 4/2018 | Loderer et al. | |
| 2019/0117116 | A1 | 4/2019 | Connolly et al. | |
| 2020/0061278 | A1 | 2/2020 | Vargas Fonseca | |
| 2020/0103457 | A1* | 4/2020 | Ghouse | G01R 31/2808 |
| 2021/0298613 | A1* | 9/2021 | Russell | A61M 1/3623 |

FOREIGN PATENT DOCUMENTS

| | | | |
|---|---|---|---|
| KR | 100228087 | B1 * | 11/1999 |
| KR | 101600689 | B1 | 2/2016 |
| KR | 20180044455 | A | 5/2018 |
| WO | 2018154407 | | 8/2018 |

OTHER PUBLICATIONS

Extended European Search Report dated Mar. 5, 2024 for EP21775452.2.

International Search Report and Written Opinion dated Jan. 5, 2023 for PCT/US2022/076814.

Notice of Allowance dated Jan. 18, 2024 for U.S. Appl. No. 17/209,663.

European Search Report dated Jun. 10, 2025 for EP22873842.3.

Examination Report dated Apr. 8, 2025 for EP21775452.2.

International Search Report and Written Opinion dated Jul. 6, 2021 for PCT/US2021/023690.

* cited by examiner 120
170
171
123
121
122
170
171
125
126

MOLDED SENSOR ASSEMBLY

RELATED APPLICATIONS

This application claims priority to U.S. Provisional Application No. 63/247,616, filed on Sep. 23, 2021 and titled, "Molded Sensor Assembly," which is hereby incorporated by reference in its entirety.

TECHNICAL FIELD

The present disclosure relates generally to devices used to measure different parameters using sensors. More specifically, the present disclosure is related to a molded sensor assembly that houses sensors for measuring parameters and methods of manufacturing molded sensor assemblies.

BRIEF DESCRIPTION OF THE DRAWINGS

The embodiments disclosed herein will become more fully apparent from the following description and appended claims, taken in conjunction with the accompanying drawings. These drawings depict only typical embodiments, which will be described with additional specificity and detail through use of the accompanying drawings in which:

DETAILED DESCRIPTION

Figure 1:
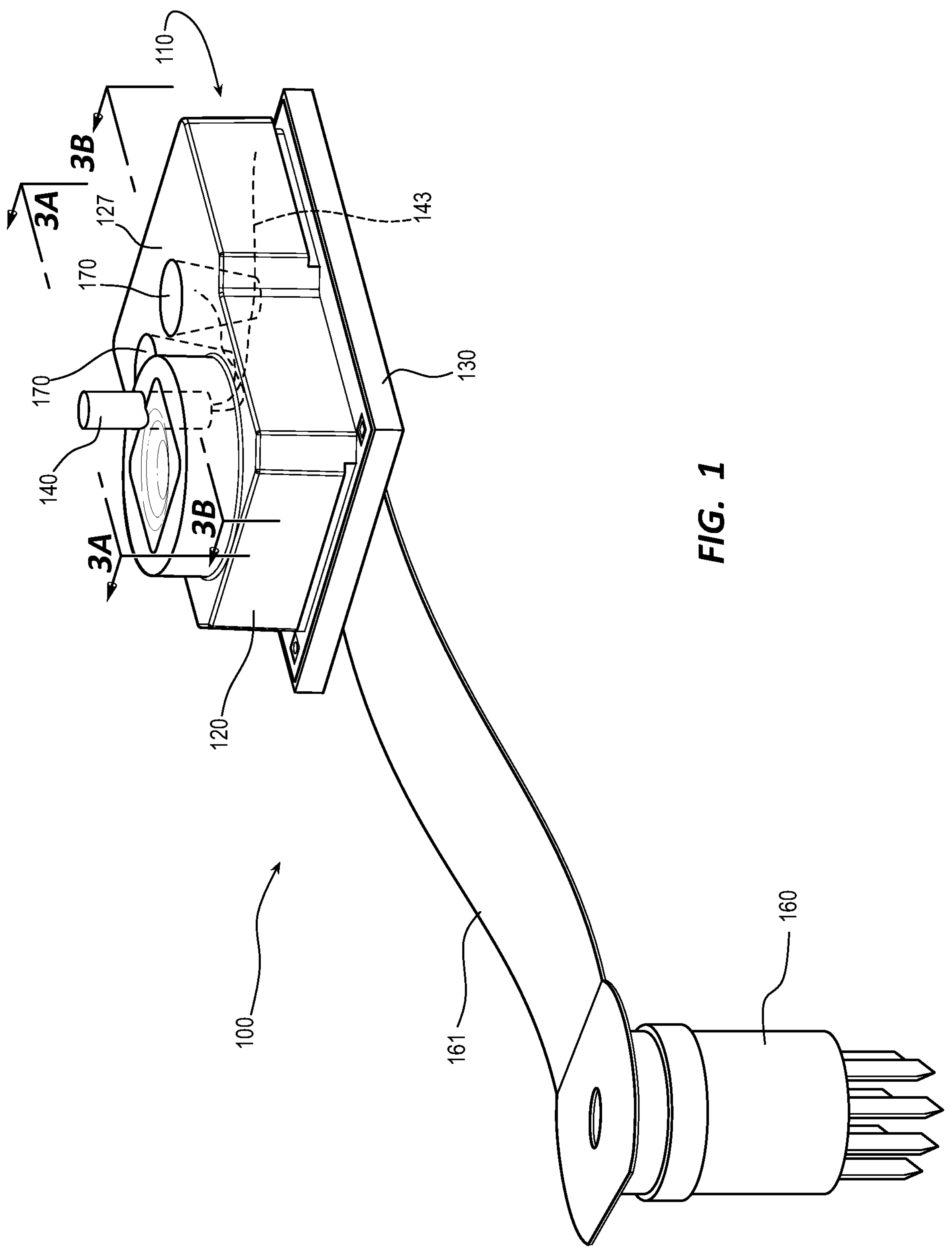
FIG. 1 is a perspective view of a sensor device assembly according to one embodiment of the present disclosure.

A sensor device assembly may be used to measure a variety of parameters depending upon the circumstances for which the sensor device assembly is used. For example, the sensor device assembly may be used in the medical field, the automotive field, or in any other suitable industry. Different types of sensors may be used to obtain the desired parameters. For example, types of sensors may include imaging sensors, temperature sensors, radiation sensors, proximity sensors, pressure sensors, position sensors, photoelectric sensors, particles sensors, motion sensors, metal sensors, level sensors, leak sensors, humidity sensors, gas sensors, chemical sensors, force sensors, flow sensors, flaw sensors, flame sensors, electrical sensors, contact sensors, non-contact sensors, and the like. Accordingly, based on a specific circumstance, a sensor device assembly may be fabricated with one or more of the above noted sensors to obtain the desired parameters for the specific circumstance. The sensors may be housed within a housing. In some situations, the sensors may be molded within a housing. The sensor device assembly may include a printed circuit board that is electrically coupled to the one or more sensors.

For example, in the medical field, a sensor device may be used to measure a variety of physiological parameters. For example, the sensor device assembly may be used to measure specific physiologic parameters, such as blood pressure, blood temperature, oxygen saturation, blood carbon dioxide level, blood pH, blood electrolytes air bubbles, and the like.

Additionally, in some applications in the automotive field, a sensor device may be used to measure one or more of pressure, temperature, flow rate, fluid composition, and/or various other parameters, including embodiments wherein pressure and temperature are measured at adjacent locations. In some instances, the sensor device may include a ceramic pressure port with insert molded glass bead thermistor.

Additionally, in some industrial applications, a sensor device may be used to measure one or more of pressure, temperature, flow rate, fluid composition, and/or various other parameters, including embodiments wherein pressure and temperature are measured at adjacent locations. In some instances, the sensor device may include a pressure port straddle (PPS) pressure port with insert molded glass bead thermistor.

Sensor devices within the scope of this disclosure includes pressure ports of various designs, which, in turn, include any port or device through which pressure is applied to a pressure sensing element. Sensor devices wherein a pressure sensor or pressure port is integrated with a temperature sensing element, including embodiments wherein the pressure and temperature sensing elements are coupled to an integrated and/or monolithic body our housing are all within the scope of this disclosure. Notwithstanding any specific examples given herein, the present disclosure applies to the use of sensor devices, including pressure ports with integrated temperature sensors, for any application. In other words, disclosure herein relating to sensor devices, including disclosure relating to designs and methods for electrically coupling such sensor device to other systems or connections, may be applied to any application wherein temperature, pressure, and/or other parameters are to be measured.

As discussed above, the sensor device assembly may include a printed circuit board in which a sensor device is coupled to the printed circuit board. The sensor device may be coupled to the printed circuit board assembly in a number of ways. A part of the present disclosure is the coupling the printed circuit board with the sensor device is to align sensor electrical contacts with the printed circuit board electrical contacts. If the contacts do not align, there is no communication between the sensor and the printed circuit board. Coupling the printed circuit board to the sensor device blindly (i.e., without visual alignment between the contacts of the sensor and the contacts of the printed circuit board prior to coupling the sensor device and the printed circuit board) leads to many rejected sensor device assemblies for lack of communication between the sensor and the printed circuit board. The present disclosure is directed to visually aligning the contacts of the sensor with the contacts of the printed circuit board to reduce the rejected sensor device assemblies.

Embodiments may be understood by reference to the drawings, wherein like parts are designated by like numerals throughout. It will be readily understood by one of ordinary skill in the art having the benefit of this disclosure that the components of the embodiments, as generally described and illustrated in the figures herein, could be arranged and designed in a wide variety of different configurations. Thus, the following more detailed description of various embodiments, as represented in the figures, is not intended to limit the scope of the disclosure but is merely representative of various embodiments. While the various aspects of the embodiments are presented in drawings, the drawings are not necessarily drawn to scale unless specifically indicated.

Various features are sometimes grouped together in a single embodiment, figure, or description thereof for the purpose of streamlining the disclosure. Many of these features may be used alone and/or in combination with one another.

The phrases "coupled to" and "in communication with" refer to any form of interaction between two or more entities, including mechanical and electrical interaction. Two components may be coupled to or in communication with each other even though they are not in direct contact with each other. For example, two components may be coupled to or in communication with each other through an intermediate component. For example, two components may be coupled together via a conductive adhesive or epoxy, a low temperature solder (i.e., indium based), a liquid metal (i.e., gallium based), ultrasonic welding, laser welding, resistance welding, and the like.

FIGS. 1-5B illustrate different views of sensor device assemblies and related components. In certain views each assembly may be coupled to, or shown with, additional components not included in every view. Further, in some views only selected components are illustrated, to provide details of the relationship of the components. Some components may be shown in multiple views, but not discussed in connection with every view. Disclosure provided in connection with any figure is relevant and applicable to disclosure provided in connection with any other figure or embodiment.

FIG. 1 depicts an embodiment of a molded sensor assembly 100 according to one embodiment of the present disclosure. In the illustrated embodiment, the molded sensor assembly 100 comprises a sensor device 110 and a connector 160. The connector 160 is electrically coupled to the sensor device 110 via a ribbon cable 161. In other embodiments, the connector 160 may be electrically coupled to the sensor device 110 via any other suitable cable or connection system. The connector 160 may be a pin type connector as depicted in FIG. 1. In other embodiments, the connector 160 may be any other suitable connector 160, such as a contact connector. In still other embodiments, the molded sensor assembly 100 may not include a connector 160. Instead, signals from the sensor device 110 may be transmitted wirelessly to a receiver.

The sensor device 110 may comprise a housing 120 and a PCB member 130. The housing 120 may comprise a pair of apertures 170 that extend from an upper surface 127 of the housing to the PCB member 130. While the illustrated embodiment shows a pair of apertures 170, the present disclosure is not so limited and the housing 120 may comprise one or more apertures 170. The apertures 170 in the illustrated embodiment are conically shaped; however, the apertures may have a variety of shapes. For example, the apertures 170 may be conical, cylindrical, pyramidical, and the like.

The sensor device 110 may comprise a plurality of sensors. FIG. 1 illustrates a first sensor (in the illustrated embodiment, the first sensor is a temperature sensor 140). For ease of disclosure, the first sensor will be described as the temperature sensor 140; however, the first sensor may be a variety of sensors and the first sensor of the present disclosure is not limited to a temperature sensor.

Figure 2:
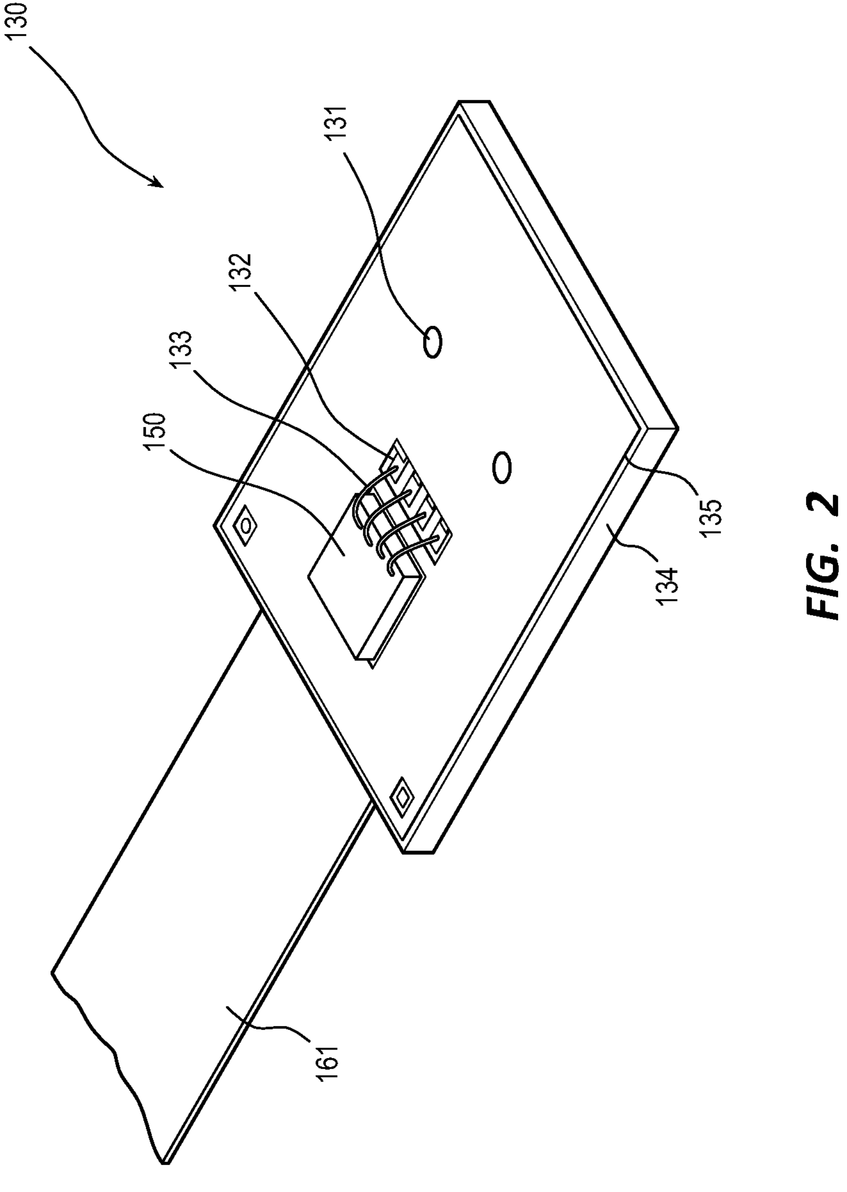
FIG. 2 is a perspective view of a printed circuit board according to one embodiment of the present disclosure.

As illustrated in FIG. 2, the PCB member 130 includes a second sensor (in the illustrated embodiment, the second sensor is a pressure sensor 150). For ease of disclosure, the second sensor will be described as the pressure sensor 150. Similar to the first sensor, the second sensor may be a variety of sensors and the second sensor of the present disclosure is not limited to a pressure sensor. In some embodiments, the PCB member may further include additional sensors based on the specific circumstances of the molded sensor assembly 100.

The PCB member 130 may further include a first sensor pad 131 (e.g. an electrical contact) and a second sensor pad 132 (e.g., an electrical contact) that electrically connects the sensors 140, 150 to the PCB member 130. For example, the temperature sensor 140 may be electrically connected to PCB member 130 via the first sensor pad 131 and the pressure sensor 150 may be electrically connected to the PCB member via the second sensor pad 132. The pressure sensor 150 is coupled to the PCB member 130 with wires 133 electrically coupling the pressure sensor 150 to the pressure sensor pad 132. In some embodiments, the wires 133 may be traces in the PCB member 130 that couples the pressure sensor pads 132 to the pressure sensor 150. The pressure sensor 150 may be any suitable type of pressure sensor.

The PCB member 130 may be a ceramic PCB comprising a ceramic or glass-reinforced epoxy laminate substrate 134 and a copper conductive layer 135. The housing 120 may be formed from any suitable material. For example, the housing 120 may be formed from polycarbonate, nylon, polyetheretherketone, polyaryle ether ketone, polyetherketoneketone, polytetrafluoroethylene, polysulfone, polyphenylsulfone, and the like. In some embodiments, the PCB member 130 may be a molded plastic with insert molded conductor traces and external leads. The housing 120 may be attached to the molded plastic PCB member 130 in the same manner as the ceramic or glass-reinforced epoxy laminate substate PCB member 130.

Figure 3A:
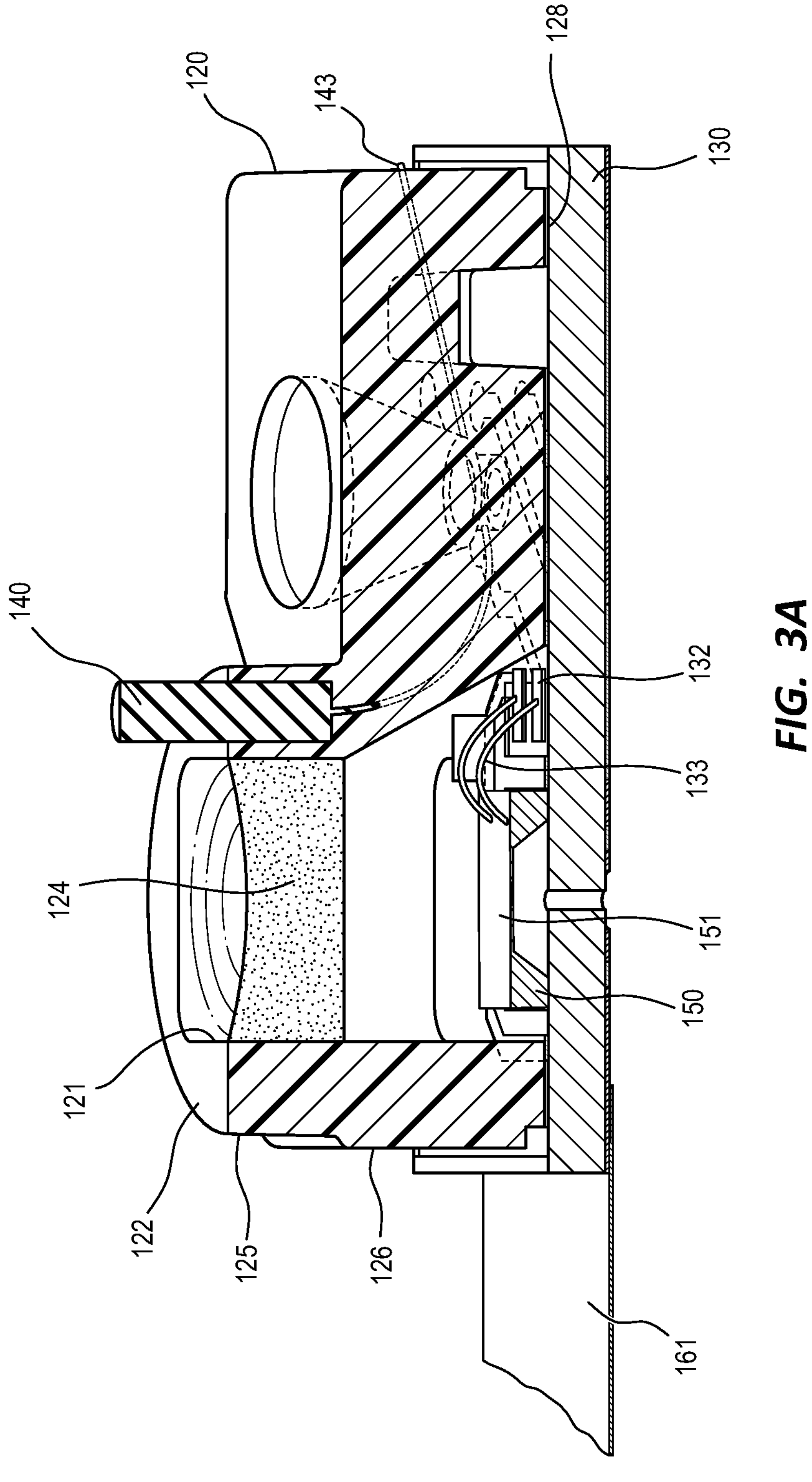
FIG. 3A is a cross-sectional perspective view of a sensor device of the sensor device assembly of FIG. 1.
Figure 3B:
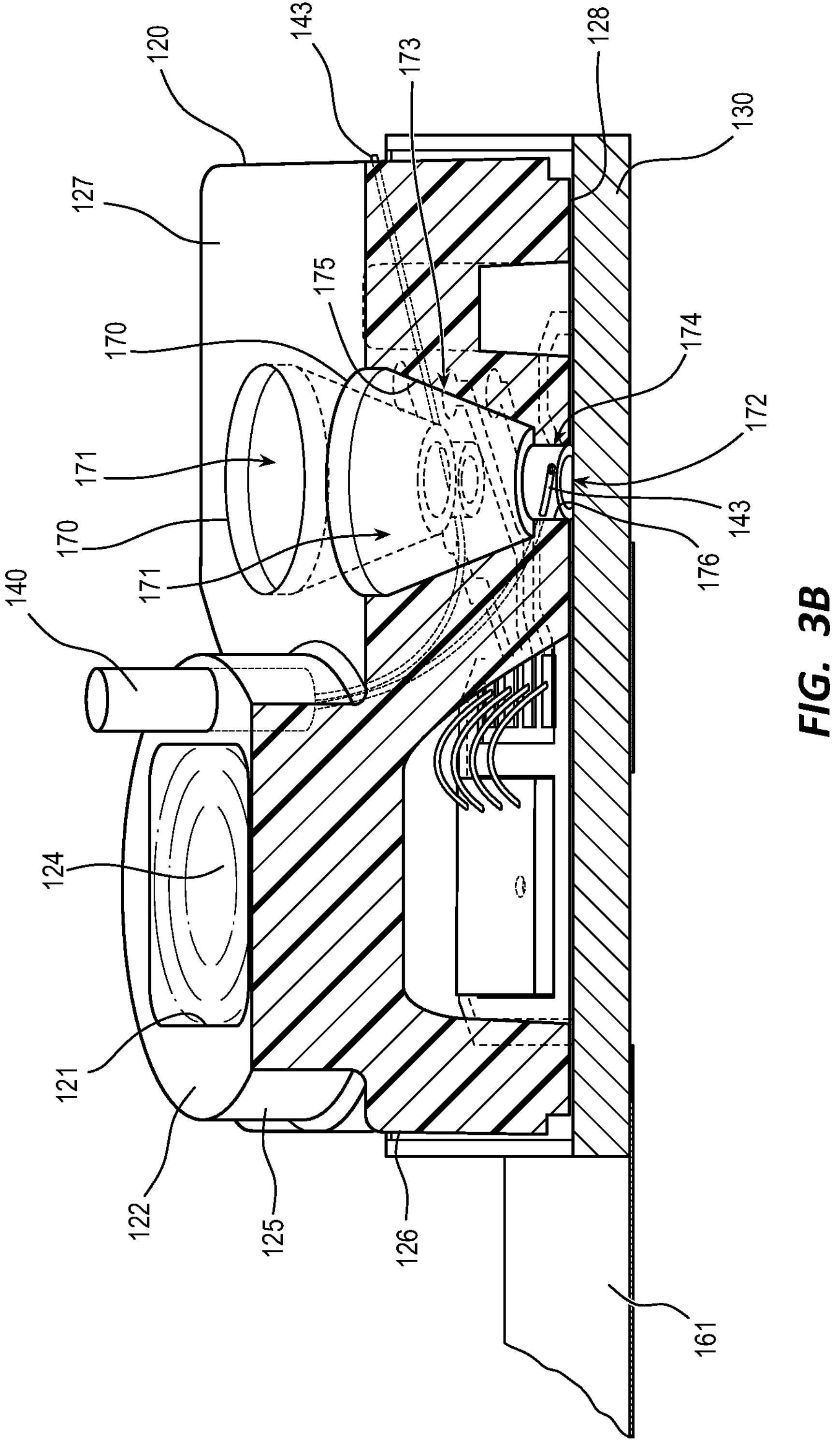
FIG. 3B is a cross-sectional perspective view of a sensor device of the sensor device assembly of FIG. 1.

FIGS. 3A and 3B illustrate cross-sectional viewings of the sensor device 110 taken along cross-section lines 3A and 3B of FIG. 1, respectively. As illustrated in FIG. 3A, the sensor device 110 may include the housing 120, the PCB member 130, the temperature sensor 140, the pressure sensor 150, and a gel 124. As will become apparent from the disclosure, the disclosure focuses on facilitating the electrical connection between the first sensor (e.g., the temperature sensor 140) and the PCB member 130 during the manufacturing process. The electrical connection may be performed via a conductive epoxy, a low temperature solder (i.e., indium based), a liquid metal (i.e., gallium based), ultrasonic welding, laser welding, resistance welding, and the like.

The housing 120 may be coupled to the PCB member 130 to form a fluid-tight seal between a lower surface 128 of the housing 120 and an upper surface of the PCB member 130. In some embodiments, the lower surface 128 of the housing 120 covers the entire upper surface of the PCB member. In the illustrated embodiment, the lower surface 128 of the housing 120 cover a majority of the upper surface of the PCB member 130, but not the entire upper surface of the PCB member 130. The housing 120 may be coupled to the PCB member 130 using any suitable technique. For example, the housing 120 can be coupled to the PCB member 130 by bonding, adhering, welding, and the like. The coupling between the housing 120 and the PCB member

130 is non-conductive. In other words, a non-conductive adhesive may be used to couple the housing 120 to the PCB member 130. In some embodiments, the coupling between the PCB member 130 and the housing 120 may be a polycarbonate bond.

As illustrated in FIG. 3B, the apertures 170 are substantially conically shaped. An opening 171 on the upper surface 127 of the housing 120 is greater than an opening 172 on a lower surface 128 of the housing 120. In the illustrated embodiment, the apertures 170 comprise an upper structure 173 and a lower structure 174. The cross-section of the upper structure 173 gradually shrinks from the opening 171 to the lower structure 174. In other words, the diameter of the upper structure gradually decreases from the opening 171 to the lower structure 174. A slope of the sidewalls 175 of the upper structure 173 may be constant. However, the slope of the sidewalls 175 of the upper structure 173 may vary along the length of the sidewalls 175. The lower structure 174 of the apertures 170 may be cylindrical with sidewalls 176 in which the sidewalls 176 are straight.

Figure 3C:
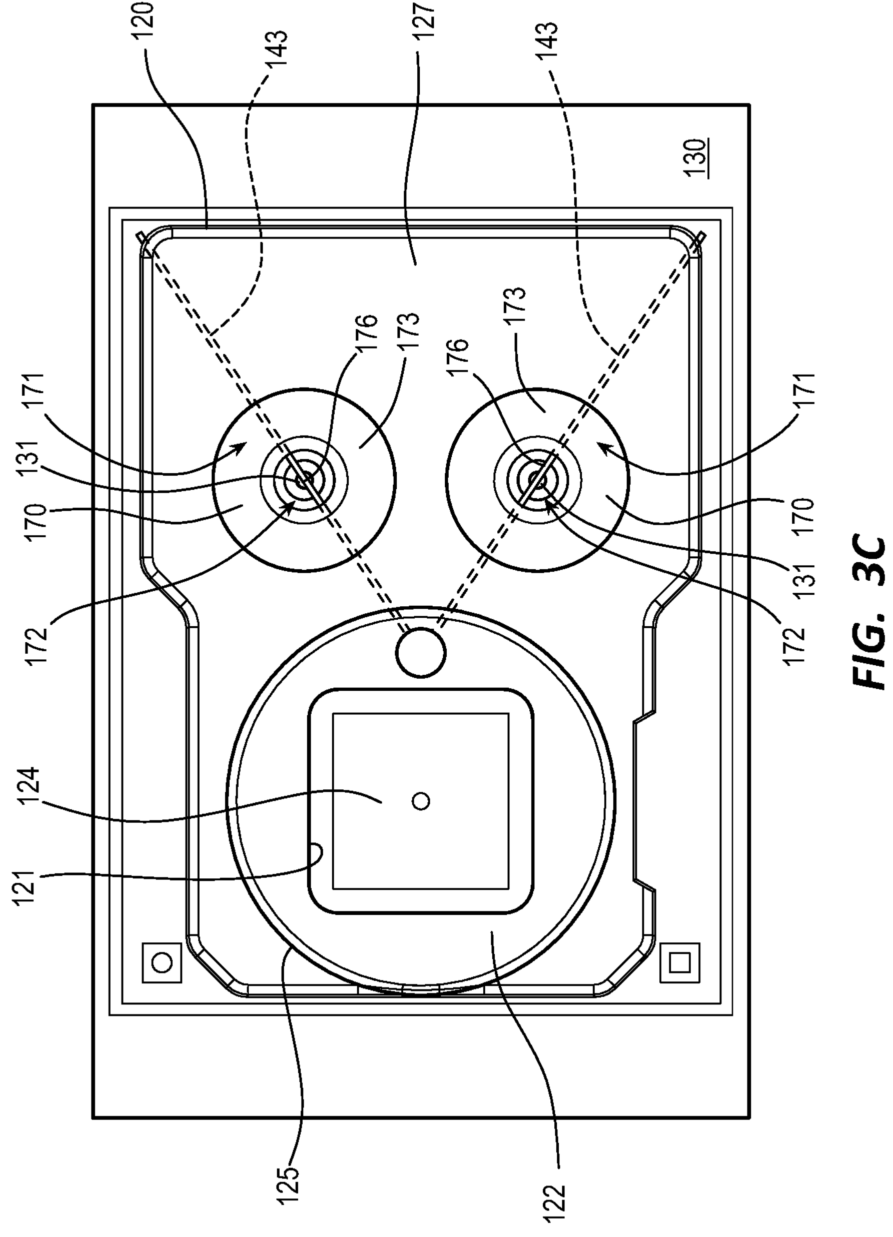
FIG. 3C is a top view of a sensor device of the sensor device assembly of FIG. 1.
Figure 4A:
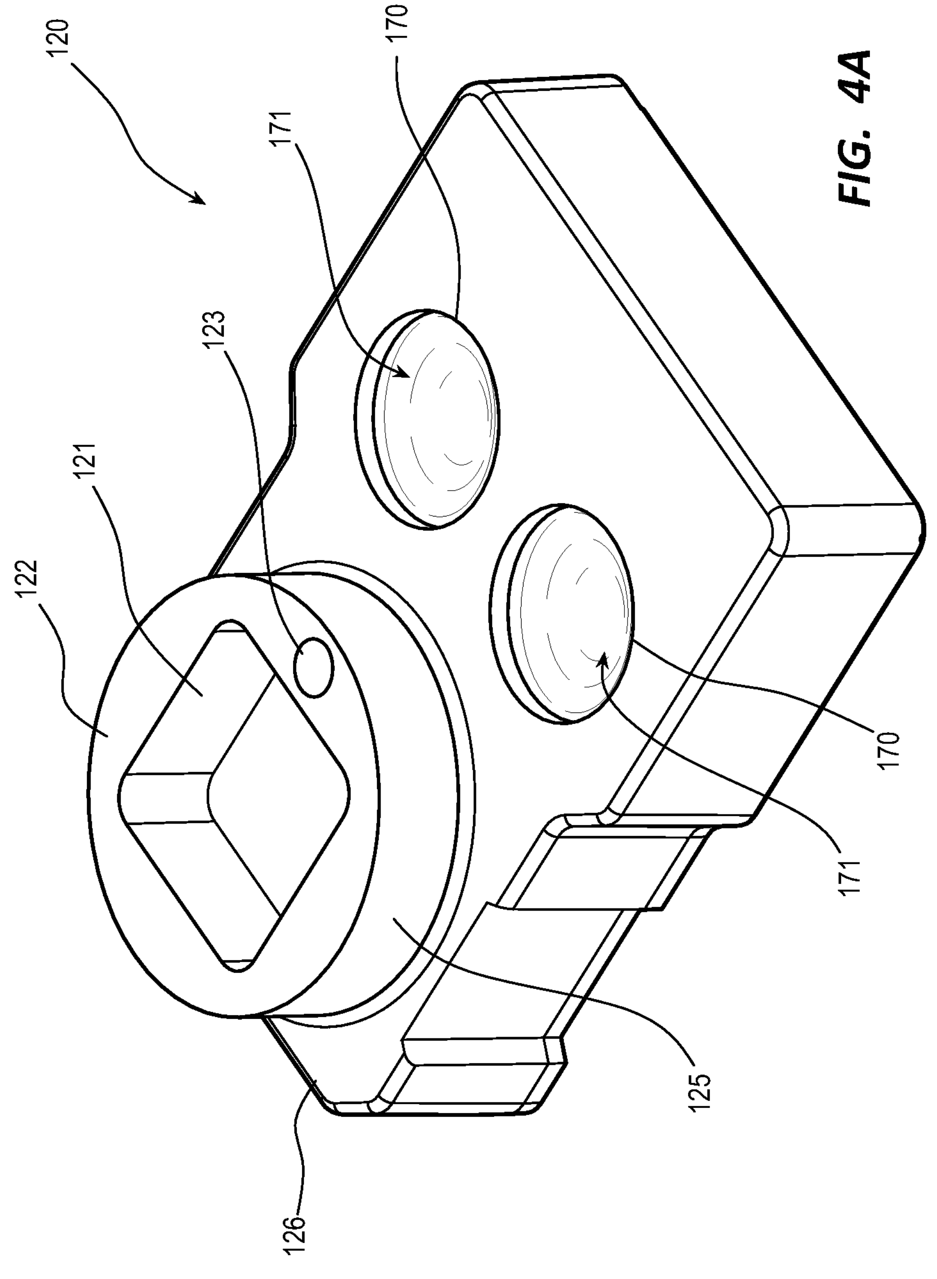
FIG. 4A is a top perspective view of a gel well housing of a sensor device according to one embodiment of the present disclosure.
Figure 4B:
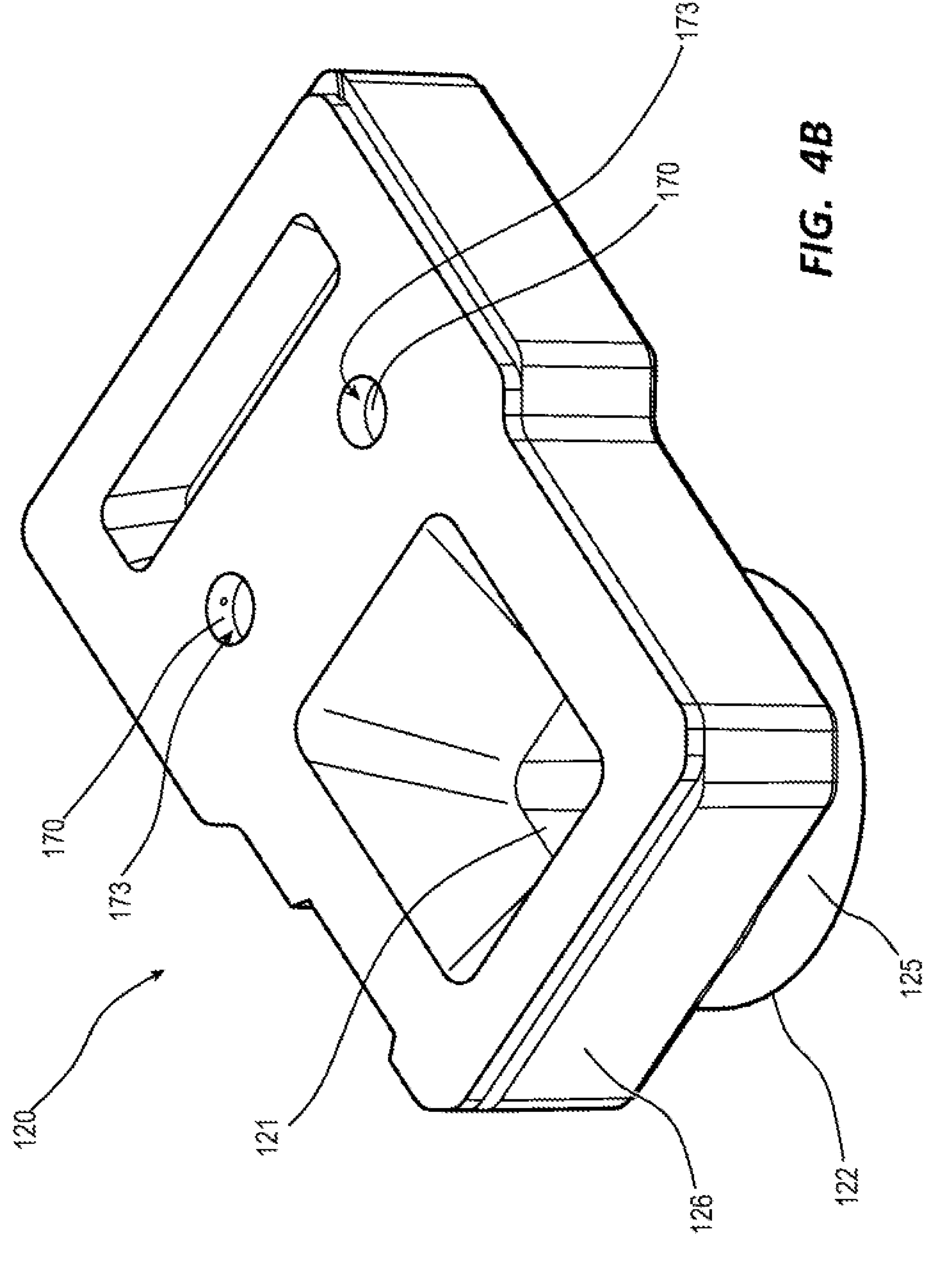
FIG. 4B is a bottom perspective view of the gel well housing of the sensor device of FIG. 4A.

The apertures 170 in the housing 120 serve a beneficial purpose when coupling the housing 120 to the PCB member 130. The apertures 170 are for visually aligning the apertures 170 with the temperature sensor pads 131. As discussed in more detail below, the temperature sensor 140 comprises a pair of wires or leads 143 that couple the temperature sensor 140 to the temperature sensor pads 131 of the PCB member 130. The wires 143 are disposed within the housing 120 and extend from a bottom of the temperature sensor 140 to opposing corners of the housing 120. In some embodiments, the wires 143 extend out of the housing 120, as illustrated in FIGS. 3A, 3B, and 3C. The wires 143 may be clipped so that the wires 143 are substantially flush with an outer surface of the housing 120. In some embodiments, the wires 143 do not extend out of the housing 120 but terminate within the housing 120 itself, as illustrated in FIG. 1.

FIG. 3C illustrates a top view of the molded sensor assembly 100. FIG. 3C illustrates each wire 143 respectfully passing through the respective apertures 170, thus leaving a portion of the wires 143 exposed in their respective apertures 170. Underneath the wires 143 on the PCB member 130, the temperature sensors pad 131 may be seen. Each wire 143 extends through their respective apertures a predetermined height above the PCB member 130, as seen in FIG. 3B.

As discussed above, the housing 120 may be coupled to the PCB member 130 using a non-conductive adhesive. Once the housing 120 is coupled to the PCB member 130, the electrical connection between the wires 143 of the temperature sensor 140 and the temperature sensor pads 131 may be completed. The connection between the wires 143 and the temperature sensor pads 131 may be done in a number of different ways, such as inserting a conductive adhesive or epoxy into the apertures 170 to couple the wires 143 of the temperature sensor 140 to the temperature sensor pads 131 disposed on the PCB member 130. Because of the visual alignment of the temperature sensors pad 131 with the housing 120, the rate of rejection of the molded sensor assemblies 100 may be dramatically decreased from blind coupling. As discussed above, other ways of performing the electrical connection may include a low temperature solder (i.e., indium based), a liquid metal (i.e., gallium based), ultrasonic welding, laser welding, resistance welding, and the like.

FIGS. 3A, 3B, 4A, and 4B illustrate the housing 120. As illustrated, the housing 120 defines a gel well 121 disposed adjacent a first end 126 of the housing 120. The gel well 121 may be configured to allow measurement of both pressure and temperature at a substantially common site. In the illustrated embodiment, the gel well 121 includes a rim 122 circumferentially surrounding the gel well 121. In some embodiments, the housing 120 may not comprise the gel well 121 and the PCB member 130 may not include the pressure sensor 150.

A sensor slot 123 may be disposed in a wall 125 of the gel well 121 and extend downward from the rim 122. As depicted, the sensor slot 123 is disposed in the wall 125 away from the first end 126 of the housing 120. In other embodiments, the sensor slot 123 may be disposed in the wall 125 adjacent the first end 126 of the housing 120. The sensor slot 123 may be configured for coupling the temperature sensor 140 to the housing 120 via an interference fit. In some embodiments, the temperature sensor 140 can be coupled to the housing 120 using any other suitable technique, such as gluing, bonding, insert molding, and the like.

As shown in FIG. 3A, the temperature sensor 140 may be disposed within the sensor slot 123 of the gel well 121. In another embodiment, the temperature sensor 140 may be disposed within a central portion of the gel well 121. Other relative positions of the temperature sensor 140 are likewise within the scope of this disclosure. The temperature sensor 140 may be any suitable type of temperature sensor 140, such as a resistance temperature detector, a negative temperature coefficient thermistor, a positive temperature coefficient thermistor, a thermocouple, and the like. The temperature sensor 140 includes wires 143 configured to electrically couple the temperature sensor 140 to the temperature sensor pad 131 of the PCB member 130. The temperature sensor 140 can be configured to have an accuracy of about plus or minus 0.1 degree Celsius and a reaction time of about 10 to 15 seconds. The temperature sensor 140 may be cylindrical in shape and have a diameter of about 0.8 mm. In other embodiments, the temperature sensor 140 may be of any other suitable shape and size.

As illustrated in FIG. 3A, the temperature sensor 140 may be disposed relative to the rim 122 of the gel well 121 such that a first end 142 of the temperature sensor 140 may directly contact the blood. In this configuration, the temperature sensor 140 may measure a temperature directly with a minimal gradient or attenuation. As depicted, the first end 142 can protrude above the rim 122. A height of the protrusion may range from about 0.001 inch to about 0.100 inch, from about 0.025 inch to about 0.075 inch, and may be about 0.050 inch. Alternatively, the first end 142 may be flush with the rim 122 such that the first end 142 neither protrudes above the rim 122 nor is recessed below the rim 122. The height of the first end 142 with respect to the rim 122 may be configured such that blood may flow over the temperature sensor 140 while minimizing turbulence, minimizing damage to the blood, and/or minimizing creation of thrombosis downstream from the temperature sensor 140.

As shown in FIG. 3A, the gel well 121 may be substantially filled with a gel 124. The gel 124 may be a silicone material or any other suitable material. The gel 124 may surround the pressure sensor 150. The gel 124 may be configured to electrically isolate the pressure sensor 150 and to transmit a pressure force from the blood adjacent a top surface of the gel 124, through the gel 124, and to the diaphragm 151 of the pressure sensor 150. The gel 124 may form a meniscus within the gel well 121 such that the top surface of the gel 124 is below the rim 122. In other embodiments, the upper surface of the gel 124 may be flush with the rim 122 or domed above the rim 122. The gel 124 may at least partially surround and isolate the temperature sensor 140. In some embodiments, the gel 124 may produce a fillet around the temperature sensor 140 that protrudes above the top of the gel well 121.

In some embodiments, the molded sensor assembly 100 may be configured to measure both blood pressure and blood temperature at a substantially common location as discussed in U.S. patent application Ser. No. 17/209,663, titled "Blood Sensor Assembly" filed Mar. 23, 2021, which is hereby incorporated by reference in its entirety. An exemplary application of the molded sensor assembly 100 is the molded sensor assembly 100 coupling to a perfusion circuit for extracorporeal circulation of blood to support a patient during cardiovascular procedures or failure. Another exemplary application is coupling to an extracorporeal hemodialysis circuit for treatment of a kidney failure patient. In some embodiments, the molded sensor assembly 100 may include sensors configured to measure or sense blood oxygen saturation, blood carbon dioxide level, blood pH, blood electrolytes, air bubbles in the blood, and the like.

Figure 5B:
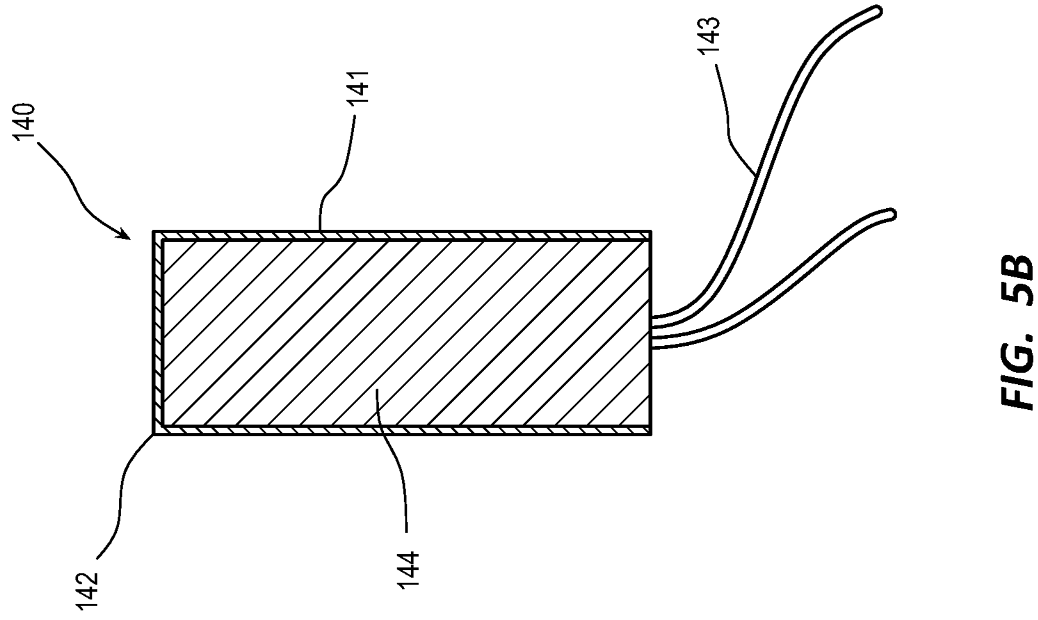
FIG. 5B is a longitudinal cross-sectional view of the sensor of FIG. 5A.
Figure 5A:
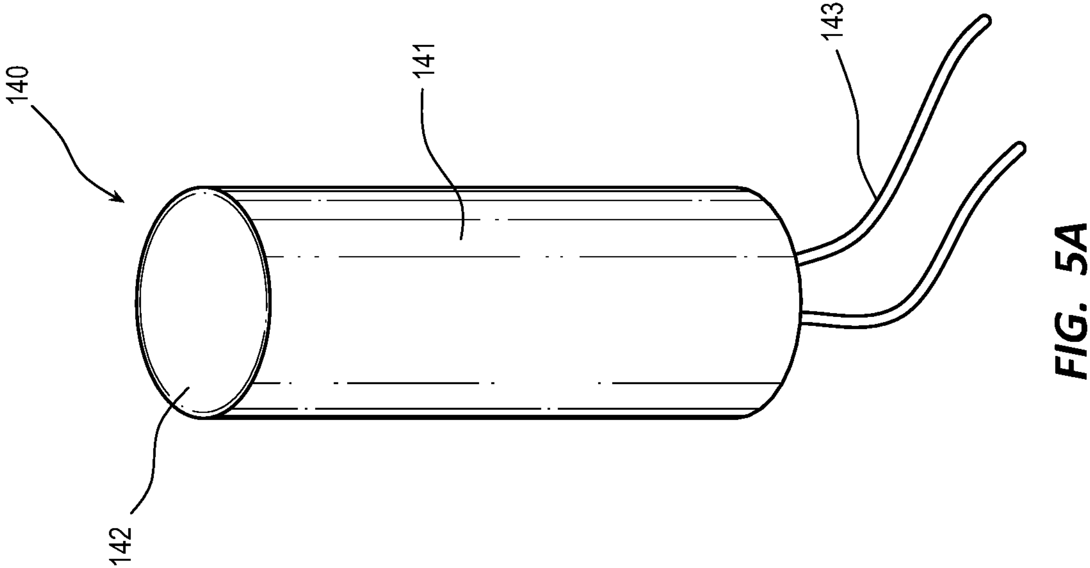
FIG. 5A is a perspective view of a sensor of a sensor device according to one embodiment of the present disclosure.

As illustrated in FIGS. 5A and 5B, the temperature sensor 140 may include a cladding 141 surrounding a sensor member 144. The cladding 141 may include any suitable hemocompatible material. For example, the cladding 141 may include polyimide, stainless steel, copper, carbon, aluminosilicate, ceramic, glass glaze, parylene, polytetrafluoroethylene, and the like. In the depicted embodiment, the cladding 141 is a polyimide dead-end tube (e.g., a tube that is closed at one end) into which the sensor member 144 is disposed. In other embodiments, the cladding 141 may be applied to the sensor member 144 using any suitable technique, such as dip coating, sputter coating, vapor deposition, and the like. A thickness of the cladding 141 may range from about 0.025 mm to about 0.254 mm. The cladding 141 may be configured to electrically isolate the sensor member 144 from the blood and to provide a hemocompatible blood contact surface while minimizing attenuation of the measured blood temperature. In some embodiments wherein the cladding 141 is configured to electrically isolate the sensor member 144, the cladding may be configured to isolate the sensor member 144 to comply with a 5 KV isolation test.

Figure 6:
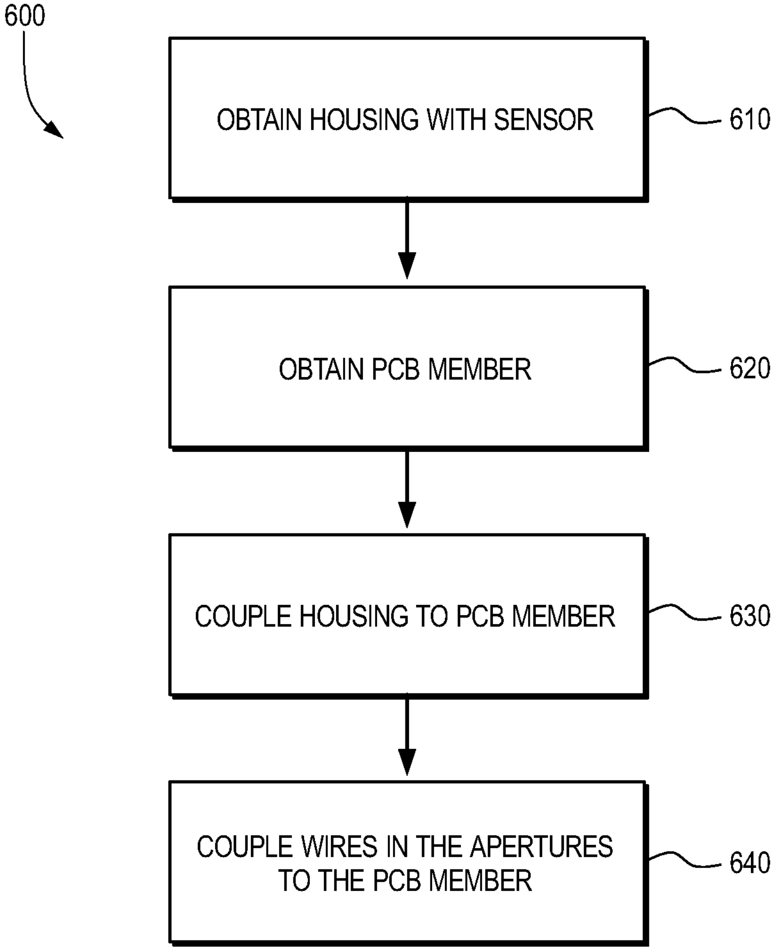
FIG. 6 is a flowchart for manufacturing a sensor device assembly according to one embodiment of the present disclosure.

FIG. 6 illustrates a flow chart of a method 600 of manufacturing the molded sensor assembly 100. Step 610 includes obtaining the housing 120 of the sensor device 110 with at least one sensor. The sensor may be disposed within the housing 120. In some embodiments, the housing 120 includes the first sensor (e.g., the temperature sensor 140).

The housing 120 may be molded by injection molding. The temperature sensor 140 may be placed and secured within a mold and the wires 143 may extend to opposing corners of the mold. The injection molding material may be inserted into the mold to form the housing 120 with the temperature sensor 140 disposed in its desired location and the wires 143 extending through the housing 120. As discussed above, a portion of the wires 143 are each exposed in their respective apertures 170.

After the housing 120 is molded, the wires 143 may be clipped so that the wires 143 are relatively flush at the outer surface of the housing 120. In some embodiments, the wires 143 may be terminated within the housing 120 so that the wires 143 do not extend outside the housing 120.

Step 620 includes obtaining the PCB member 130. As discussed above, the PCB member 130 may include additional sensors and the PCB member 130 further includes the temperature sensor pads 131 for electrically connecting the wires 143 of the temperature sensor 140 to the temperature sensor pads 131.

Step 630 includes coupling the housing 120 to the PCB member 130. Before coupling the housing 120 to the PCB member 130, the apertures 170 are aligned with their respective temperature sensor pad 131 so that the wires 143 of the temperature sensor 140 may be coupled to the temperature sensor pad 131 of the PCB member 130. As discussed above, the housing 120 and the PCB member 130 may be coupled together using a non-conductive adhesive.

Step 640 includes coupling the wires 143 exposed in their respective apertures 170 to the PCB member 130. The portion of the wires 143 exposed in their respective apertures are coupled to the temperature sensor pad 131 via a conductive adhesive or epoxy, thereby electrically coupling the temperature sensor 140 to the PCB member 130. As discussed above, other ways of performing the electrical connection may include a low temperature solder (i.e., indium based), a liquid metal (i.e., gallium based), ultrasonic welding, laser welding, resistance welding, and the like.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

References to approximations are made throughout this specification, such as by use of the term "substantially." For each such reference, it is to be understood that, in some embodiments, the value, feature, or characteristic may be specified without approximation. For example, where qualifiers such as "about" and "substantially" are used, these terms include within their scope the qualified words in the absence of their qualifiers. For example, where the term "substantially perpendicular" is recited with respect to a feature, it is understood that in further embodiments, the feature can have a precisely perpendicular configuration.

Similarly, in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

Without further elaboration, it is believed that one skilled in the art can use the preceding description to utilize the invention to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. Moreover, the order of the steps or actions of the methods disclosed herein may be changed by those skilled in the art without departing from the scope of the present disclosure. In other words, unless a specific order of steps or actions is required for proper operation of the embodiment, the order or use of specific steps or actions may be modified. The scope of the invention is therefore defined by the following claims and their equivalents.

The invention claimed is:

1. A molded sensor assembly comprising:
   a housing comprising a first aperture that extends from an upper surface to a lower surface of the housing;
   a printed circuit board member coupled to the lower surface of the housing; and
   a sensor disposed with the housing, the sensor comprising a first wire that is electrically coupled to the printed circuit board member,
   wherein the first wire extends through a first sidewall to an opposing sidewall of the first aperture, and
   wherein the housing further comprises a second aperture that extends from the upper surface to the lower surface of the housing.

2. The molded sensor assembly of claim 1, wherein the lower surface of the housing is coupled to the printed circuit board member by a non-conductive adhesive.

3. The molded sensor assembly of claim 1, wherein the first aperture comprises a substantially conical shape.

4. The molded sensor assembly of claim 1, wherein the first aperture comprises an upper structure and a lower structure, wherein the upper structure comprises a conical shape and the lower structure comprises a cylindrical shape.

5. The molded sensor assembly of claim 1, wherein the sensor further comprises a second wire that is electrically coupled to the printed circuit board member and extends through the second aperture.

6. The molded sensor assembly of claim 1, wherein the printed circuit board member comprises an electrical contact to connect to the sensor, wherein when the printed circuit board member is coupled to the housing, the electrical contact of the printed circuit board member is aligned with the first aperture such that the electrical contact is exposed.

7. The molded sensor assembly of claim 1, wherein the first wire of the sensor extends through the first aperture and is electrically coupled to the printed circuit board member via a conductive adhesive that is applied to the printed circuit board member and the first wire through the first aperture.

8. The molded sensor assembly of claim 1, wherein the first wire of the sensor extends through the first aperture and is electrically coupled to the printed circuit board member via a low temperature solder that is performed in the first aperture.

9. The molded sensor assembly of claim 1, wherein the first wire of the sensor extends through the first aperture and is electrically coupled to the printed circuit board member via a ultrasonic welding that is performed in the first aperture.

10. The molded sensor assembly of claim 1, wherein the first wire of the sensor extends through the first aperture and is electrically coupled to the printed circuit board member via a laser welding that is performed in the first aperture.

11. The molded sensor assembly of claim 1, wherein the first wire of the sensor extends through the first aperture and is electrically coupled to the printed circuit board member via a resistance welding that is performed in the first aperture.

12. A method of manufacturing a molded sensor assembly comprising:

obtaining a housing comprising:
   a first aperture that extends from an upper surface of the housing to a lower surface of the housing;
   a second aperture that extends from the upper surface of the housing to the lower surface of the housing; and
   a sensor disposed within the housing with a first wire and a second wire that extend through the housing,
   wherein the first wire extends through a first sidewall to an opposing sidewall of the first aperture a predetermined distance above the lower surface of the housing and the second wire extends through a second sidewall to an opposing sidewall of the second aperture a predetermined distance above the lower surface of the housing, and
   wherein the housing further comprises a second aperture that extends from the upper surface to the lower surface of the housing;
   obtaining a printed circuit board member with a first electrical contact and a second electrical contact and configured to electrically connect the first wire of the sensor to the first electrical contact of the printed circuit board member and the second wire of the sensor to the second electrical contact of the printed circuit board member; and
   coupling the lower surface of the housing to the printed circuit board member, wherein the first electrical contact is aligned with the first aperture of the housing and the second electrical contact is aligned with the second aperture of the housing.

13. The method of claim 12, wherein the lower surface of the housing is coupled to the printed circuit board member with a non-conductive adhesive.

14. The method of claim 12, further comprising coupling an exposed portion of the first wire in the first aperture to the first electrical contact of the printed circuit board member and the second wire in the second aperture to the second electrical contact with a conductive adhesive.

15. The method of claim 12, further comprising coupling an exposed portion of the first wire in the first aperture to the first electrical contact of the printed circuit board member and the second wire in the second aperture to the second electrical contact with a low temperature solder.

16. The method of claim 12, further comprising coupling an exposed portion of the first wire in the first aperture to the first electrical contact of the printed circuit board member and the second wire in the second aperture to the second electrical contact with a liquid metal.

17. The method of claim 12, further comprising coupling an exposed portion of the first wire in the first aperture to the first electrical contact of the printed circuit board member and the second wire in the second aperture to the second electrical contact with ultrasonic welding.

18. The method of claim 12, further comprising coupling an exposed portion of the first wire in the first aperture to the first electrical contact of the printed circuit board member and the second wire in the second aperture to the second electrical contact with laser welding.

19. The method of claim 12, further comprising coupling an exposed portion of the first wire in the first aperture to the first electrical contact of the printed circuit board member and the second wire in the second aperture to the second electrical contact with resistance welding.

* * * * *